G. S. HAVEN.
Plow.

No. 208,680. Patented Oct. 8, 1878.

Attest:
James Fielding
Frank J Gibson

Inventor
George S. Haven

UNITED STATES PATENT OFFICE.

GEORGE S. HAVEN, OF RACINE, WISCONSIN.

IMPROVEMENT IN PLOWS.

Specification forming part of Letters Patent No. 208,680, dated October 8, 1878; application filed June 27, 1878.

*To all whom it may concern:*

Be it known that I, GEORGE S. HAVEN, of Racine, in the county of Racine and State of Wisconsin, have invented a new and useful Improvement in Attaching Standards or Beams to Plows, of which the following is a specification:

This invention relates to an improved adjustable attachment for fastening beams or standards to plows, as more fully hereinafter described.

Figure 1:
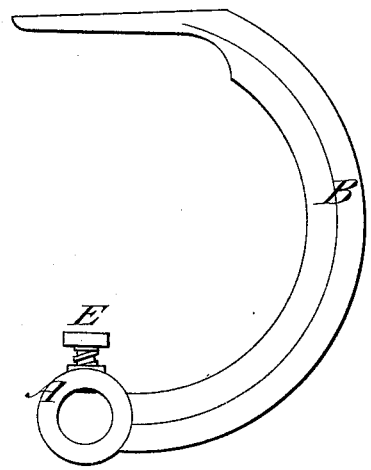
Figure 2:
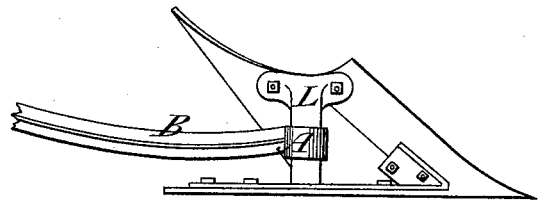

In the drawings, Figure 1 is a side elevation of a plow-standard. Fig. 2 is a bottom view of a plow, to show how brace L of the same is encircled by collar A of standard.

This improvement consists in shaping the lower extremity of the wrought beam or standard to the form of eye or collar A, through which passes brace L of the plow.

It will be readily seen that I have a cheap, durable, adjustable connection between plow and beam.

The point of beam may be raised or lowered to regulate the depth of cut, or collar A slid along brace L to throw plow to or from land, while set-screw E holds beam at whatever point set.

I do not confine myself to the one set-screw; will use two or more if needed.

An adjustable connection I received a patent for on the 23d of April last, and this is an improvement on same, as it costs less and is more easily adjusted.

What I claim as new is—

The combination of the curved standard or plow-beam B, with a collar, A, formed on its lower end, and set-screws E, with the brace L and the mold-board and land-side, whereby the beam or standard is connected to the lower part of the plow only, and provided with lateral adjustment, substantially as shown and described.

In testimony that I claim the foregoing I have hereunto set my hand this 22d day of June, 1878.

GEORGE S. HAVEN.

Witnesses:
 JAMES FIELDING,
 FRANK J. GIBSON.